United States Patent
Yoshida

(10) Patent No.: US 9,727,224 B2
(45) Date of Patent: Aug. 8, 2017

(54) IMAGE PROCESSING DEVICE, IMAGE PROCESSING METHOD, AND STORAGE MEDIUM STORING IMAGE PROCESSING PROGRAM

(71) Applicant: FUJIFILM CORPORATION, Tokyo (JP)

(72) Inventor: Masako Yoshida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 14/740,294

(22) Filed: Jun. 16, 2015

(65) Prior Publication Data

US 2016/0004402 A1 Jan. 7, 2016

(30) Foreign Application Priority Data

Jul. 1, 2014 (JP) .................. 2014-136324

(51) Int. Cl.
| | | |
|---|---|---|
| *G06F 3/048* | (2013.01) | |
| *G06F 3/0485* | (2013.01) | |
| *H04N 1/00* | (2006.01) | |
| *G06F 3/0482* | (2013.01) | |
| *G06F 3/0484* | (2013.01) | |
| *G06F 17/24* | (2006.01) | |

(52) U.S. Cl.
CPC .......... *G06F 3/0485* (2013.01); *G06F 3/0482* (2013.01); *G06F 3/04842* (2013.01); *G06F 17/248* (2013.01); *H04N 1/00196* (2013.01)

(58) Field of Classification Search
CPC ........................... G06F 3/0485; G06F 3/04886
USPC ........................................................ 715/785
See application file for complete search history.

(56) References Cited

U.S. PATENT DOCUMENTS 7,619,677 B2 * 11/2009 Matsuda ............ H04N 5/23293
348/333.01
8,300,064 B2 10/2012 Yamaji et al.
8,875,044 B2 10/2014 Ozawa et al.
9,081,467 B2 7/2015 Miyazaki
(Continued)

FOREIGN PATENT DOCUMENTS

JP 2002-216051 8/2002
JP 2007-43247 2/2007
(Continued)

OTHER PUBLICATIONS

Japan Office Action for Application No. 2014-136324 dated Sep. 14, 2016.
(Continued)

*Primary Examiner* — William Titcomb
(74) *Attorney, Agent, or Firm* — Young & Thompson

(57) ABSTRACT

A display section includes a finished-state display area. A finished image is displayed in the finished-state display area. Target images selected based on one of preliminarily-determined plural patterns are arranged in the finished image. Upon switching operation with use of switching buttons, a first finished image in which the target images selected based on a first pattern are arranged, a second finished image in which the target images selected based on a second pattern are arranged, and a third finished image in which the target images selected based on a third pattern are arranged are displayed in a scrollable manner in the finished-state display area.

13 Claims, 11 Drawing Sheets

(56) References Cited

U.S. PATENT DOCUMENTS

| | | |
|---|---|---|
| 2002/0099565 A1 | 7/2002 | Kito |
| 2005/0134946 A1 | 6/2005 | Tsue et al. |
| 2010/0083154 A1* | 4/2010 | Takeshita .............. G06F 3/0486 |
| | | 715/769 |
| 2012/0235912 A1* | 9/2012 | Laubach ............. G06F 3/04895 |
| | | 345/163 |

FOREIGN PATENT DOCUMENTS

| | | |
|---|---|---|
| JP | 2009-260957 | 11/2009 |
| JP | 2010-124181 | 6/2010 |
| JP | 2013-16123 | 1/2013 |
| JP | 2013-134536 | 7/2013 |
| JP | 2013-182524 | 9/2013 |

OTHER PUBLICATIONS

Extended European Search Report dated Nov. 2, 2015; Application No. 15173194.0.

\* cited by examiner

IMAGE PROCESSING DEVICE, IMAGE PROCESSING METHOD, AND STORAGE MEDIUM STORING IMAGE PROCESSING PROGRAM

CROSS-REFERENCE TO RELATED APPLICATIONS

The present application claims priority under 35 U.S.C. §119 to Japanese Patent Application No. 2014-136324, filed Jul. 1, 2014. The above application is hereby expressly incorporated by reference, in its entirety, into the present application.

BACKGROUND OF THE INVENTION

1. Field of the invention

The present invention relates to an image processing device, an image processing method, and a storage medium storing an image processing program.

2. Description Related to the Prior Art

A terminal device disposed at a shop such as a photo studio and a laboratory is known. A storage memory such as a digital camera and a memory card, in which image data obtained by capturing an image of an object is stored, is set to the terminal device, and the terminal device loads the image data stored in the storage memory. The terminal device displays a list of the loaded image data in a reduced size, and receives a print order upon selection of desired target images to be printed among the images displayed in the list by a user.

An image editing apparatus for creating an album with use of a plurality of images is known (for example, see U.S. Patent Application Publication No. 2005/0134946 corresponding to Japanese Patent No. 4315344). The image editing apparatus displays a list of a plurality of images together with a template having image insertion areas for creating an album on a monitor. Upon selection of images to be inserted into the image insertion areas among the images displayed in the list, the image editing apparatus creates an album.

A user selects a template at first, and then selects target images in the image editing apparatus described above. However, in some cases, a user feels inclined to replace the target images arranged in the template. In this case, it becomes necessary to return to a previous image selection screen and select the target images again. Upon returning to the previous image selection screen, for example, the selection of the images is cleared and it becomes necessary to select the images again, which results in an extremely bothersome operation.

SUMMARY OF THE INVENTION

An object of the present invention is to provide an image processing device, an image processing method, and a storage medium storing an image processing program, capable of facilitating an operation for reselecting target images.

An image processing device according to an aspect of the present invention includes a display section, a pattern selection section, a finished image generator, a transitional image generator, and a display controller. The display section displays a list display area in which a plurality of inputted images are arranged and a finished-state display area disposed next to the list display area. The finished-state display area displays a finished image in which a plurality of target images selected from the list display area are arranged. The pattern selection section selects one of a plurality of patterns for selecting the target images or selects one of a plurality of patterns showing templates to be used for arranging the target images. The finished image generator generates the finished image in which the target images are arranged based on the pattern. The transitional image generator generates a transitional image in which a plurality of the finished images are displayed in a scrollable manner in the finished-state display area. A plurality of the finished images display the target images based on a plurality of the patterns containing at least one of a plurality of the patterns to which pattern selection is switched by the pattern selection section. The display controller performs a control to display the transitional image and then display the finished image based on one of the patterns to which the pattern selection is switched in the finished-state display area.

The transitional image generator generates a transitional image in which a first finished image, a second finished image, and a third finished image are displayed in a scrollable manner based on three patterns containing at least a second pattern to be switched, in the case where the pattern selection is switched from a first pattern to the second pattern by the pattern selection section. The first finished image, the second finished image, and the third finished image are scrolled and displayed in this order from an upstream side in a scrolling direction, and then the finished image to be switched is displayed at the center of the finished-state display area in the transitional image.

A finished image contained in the transitional image displayed by the transitional image generator is preferably reduced in size so as to have a size smaller than that of the finished image generated by the finished image generator, because it becomes possible to display at least part of or whole of the first to third finished images in the finished-state display area at the same time. The scrolling direction may be along a short side of the display section, because the transitional image is displayed in a reduced size. The finished image preferably includes a plurality of the target images two-dimensionally arranged in a plurality of rows and a plurality of columns.

The image processing device further includes an image selector for generating a plurality of image selection patterns based on a plurality of predetermined conditions in the case where the pattern selection section selects one of a plurality of the patterns for selecting the target images as an image selection pattern. The image selection pattern includes a pattern for selecting the target images based on conditions relating to information contained in the inputted images. The information contained in the image includes image quality information, face image information, background image information, image capturing information, attribute information, and the like. It is preferable that the target image is selected based on any of such information. Further, the image selection pattern may contain a pattern for selecting the inputted images in a random manner. The pattern selection section may be switching buttons displayed in the finished-state display area. In this case, the switching buttons may be manipulated by clicking a mouse, or a touch sensor may be provided to the display section such that the switching buttons are touched. Alternatively, the pattern selection section may be provided with a detector for detecting input of a gesture.

The image processing device further includes an order section for making an order for printing the finished image displayed in the finished-state display area.

An image processing method according to an aspect of the present invention includes a display step, a pattern selection step, a finished image generating step, a transitional image generating step, and a display controlling step. The display step displays a list display area in which a plurality of inputted images are arranged and a finished-state display area disposed next to the list display area. The finished-state display area displays a finished image in which a plurality of target images selected from the list display area are arranged. The pattern selection step selects one of a plurality of patterns for selecting the target images or selects one of a plurality of patterns showing templates to be used for arranging the target images. The finished image generating step generates the finished image in which the target images are arranged based on the pattern. The transitional image generating step generates a transitional image in which a plurality of the finished images are displayed in a scrollable manner in the finished-state display area. A plurality of the finished images display the target images based on a plurality of the patterns containing at least one of a plurality of the patterns to which pattern selection is switched. The display controlling step performs a control to display the transitional image and then display the finished image based on one of the patterns to which the pattern selection is switched in the finished-state display area.

An image processing program stored in a storage medium in a computer-readable manner according to an aspect of the present invention makes a computer execute a display step, a pattern selection step, a finished image generating step, a transitional image generating step, and a display controlling step. The display step displays a list display area in which a plurality of inputted images are arranged and a finished-state display area disposed next to the list display area. The finished-state display area displays a finished image in which a plurality of target images selected from the list display area are arranged. The pattern selection step selects one of a plurality of patterns for selecting the target images or selects one of a plurality of patterns showing templates to be used for arranging the target images. The finished image generating step generates the finished image in which the target images are arranged based on the pattern. The transitional image generating step generates a transitional image in which a plurality of the finished images are displayed in a scrollable manner in the finished-state display area. A plurality of the finished images display the target images based on a plurality of the patterns containing at least one of a plurality of the patterns to which pattern selection is switched. The display controlling step performs a control to display the transitional image and then display the finished image based on one of the patterns to which the pattern selection is switched in the finished-state display area.

According to the present invention, upon selection of one of a plurality of the patterns, a plurality of the finished images, which display the target images based on a plurality of the patterns including the selected one of a plurality of the patterns, are displayed in a scrollable manner. Thereby, it becomes possible to make it recognized that there are the options for the finished images promptly and perform an operation for reselecting the target images readily.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
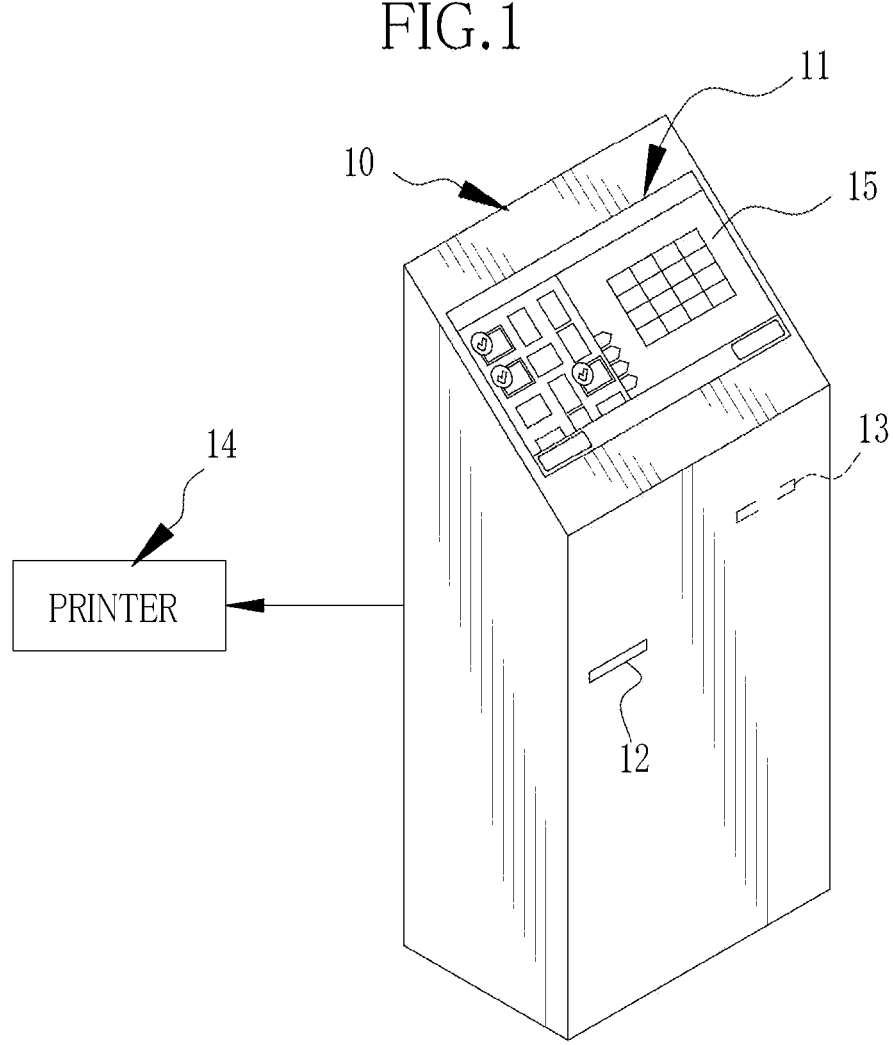
FIG. 1 is a perspective view illustrating a print order reception apparatus.

FIG. 1 shows a print order reception apparatus 10 according to an embodiment of the present invention. As shown in FIG. 1, the print order reception apparatus 10 includes a display section 11, a slot 12, a wireless connector 13. Additionally, a printer 14 is externally connected to the print order reception apparatus 10. The display section 11 is a horizontally long screen, and has a touch sensor 15. For example, a memory card in which image data and the like are stored is connected to the slot 12. For example, a mobile phone or a personal digital assistance is wirelessly connected to the wireless connector 13. The print order reception apparatus 10 loads image data from a device connected thereto. The loaded image data is subjected to size reduction processing so as to be thumbnail images. A list of the thumbnail images is displayed on the display section 11. A user selects an image to be printed (hereinafter referred to as "target image") from the thumbnail images displayed in the list, and performs other operations, so as to create order information.

The printer 14 loads the image data and the order information containing customer identification data from the print order reception apparatus 10, and performs printing processing corresponding to the order information. At a shop, the customer receives printed photographs and pays printing fees.

Although the print order reception apparatus 10 is connected one by one to the printer 14 in FIG. 1, a plurality of the print order reception apparatuses 10 may be connected to the printer 14. Further, in the case where the printer 14 to be connected to the print order reception apparatus 10 is disposed in a remote location, the printer 14 and the print order reception apparatus 10 may be connected to each other using LAN (Local Area Network) or Internet. Furthermore, the printer 14 and the print order reception apparatus 10 may be wirelessly connected to each other. Further, a mouse, a keyboard, or the like may be provided to the print order reception apparatus 10 so as to create the order information by manipulation of the mouse, the keyboard, or the like.

An order screen includes a print order screen 16 in which shuffle print as one of print styles is selected. According to the shuffle print, plural images selected from among the loaded images are arranged in one printing sheet and printed. Order information of the shuffle print is created by selecting target images from the list of the thumbnail images after selecting a template. There are prepared a plurality kinds of images as the template, for example, which are different from one another in any one of a background image and the number, position, size, or orientation of the target images. The selected plural target images are arranged in the selected template.

Figure 2:
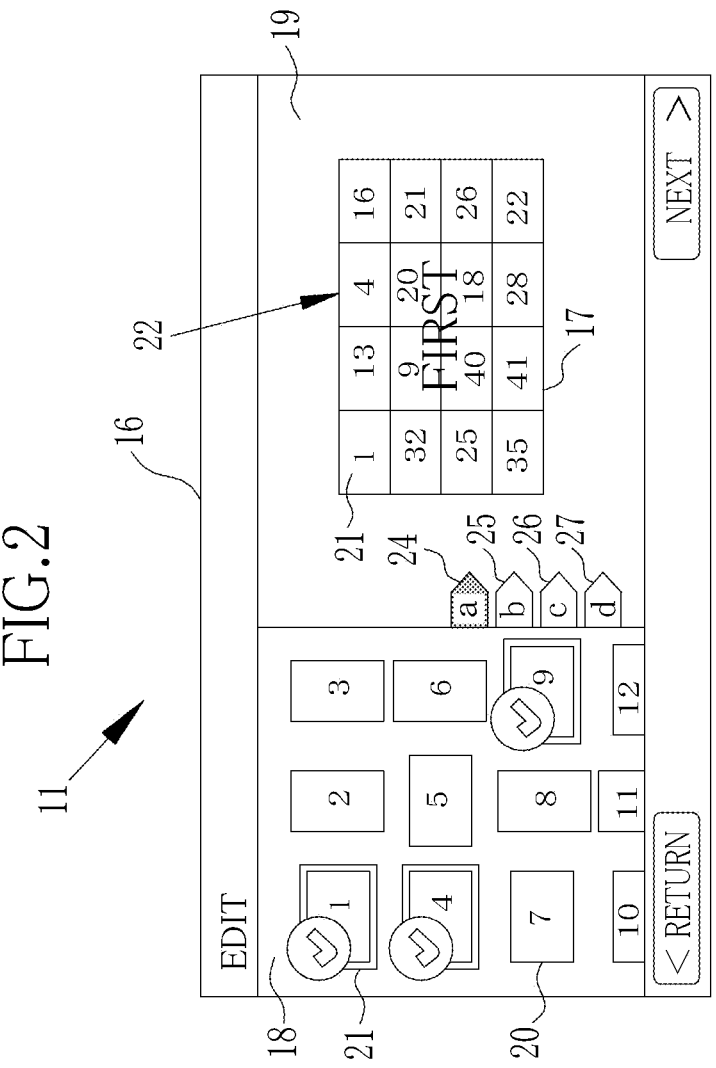
FIG. 2 is an explanatory view of a print order screen.

FIG. 2 shows the print order screen 16. As shown in FIG. 2, the print order screen 16 includes a list display area 18 and a finished-state display area 19 disposed next to the list display area 18. Thumbnail images (hereinafter referred to as list images) 20 obtained by subjecting the loaded images to size reduction processing are displayed in the list display area 18.

A finished image 22, which is obtained by arranging a plurality of the target images 21 selected from the list display area 18 in a template 17, is displayed in the finished-state display area 19. The target images 21 are two-dimensionally arranged in a plurality of rows and a plurality of columns in the finished image 22. Additionally, switching buttons 24 to 27 are disposed in the finished-state display area 19. Each of the switching buttons 24 to 27 accepts a touch operation so as to select one of plural patterns for selecting the target images 21.

Incidentally, the switching buttons 24 to 27 may receive an input in response to clicking of a mouse or a function key of a keyboard, for example. The switching buttons 24 to 27 are one example of a pattern selection section. The switching buttons 24 to 27 may be displayed outside the finished-state display area 19.

Further, in FIG. 2, in the case where all the list images 20 cannot fit in one screen, the list display area 18 is scrolled in a vertical direction, for example. Further, each of the target images 21 is highlighted by a check mark such as a tick mark or a thick frame in the list display area 18. Incidentally, the number shown in each of the list images 20 and the target images 21 represents the order of loading of inputted images, for example. In this embodiment, the target image 21 selected in the list display area 18 is disposed in a frame having the same number as that of the target image 21 within the finished-state display area 19.

Figure 3:
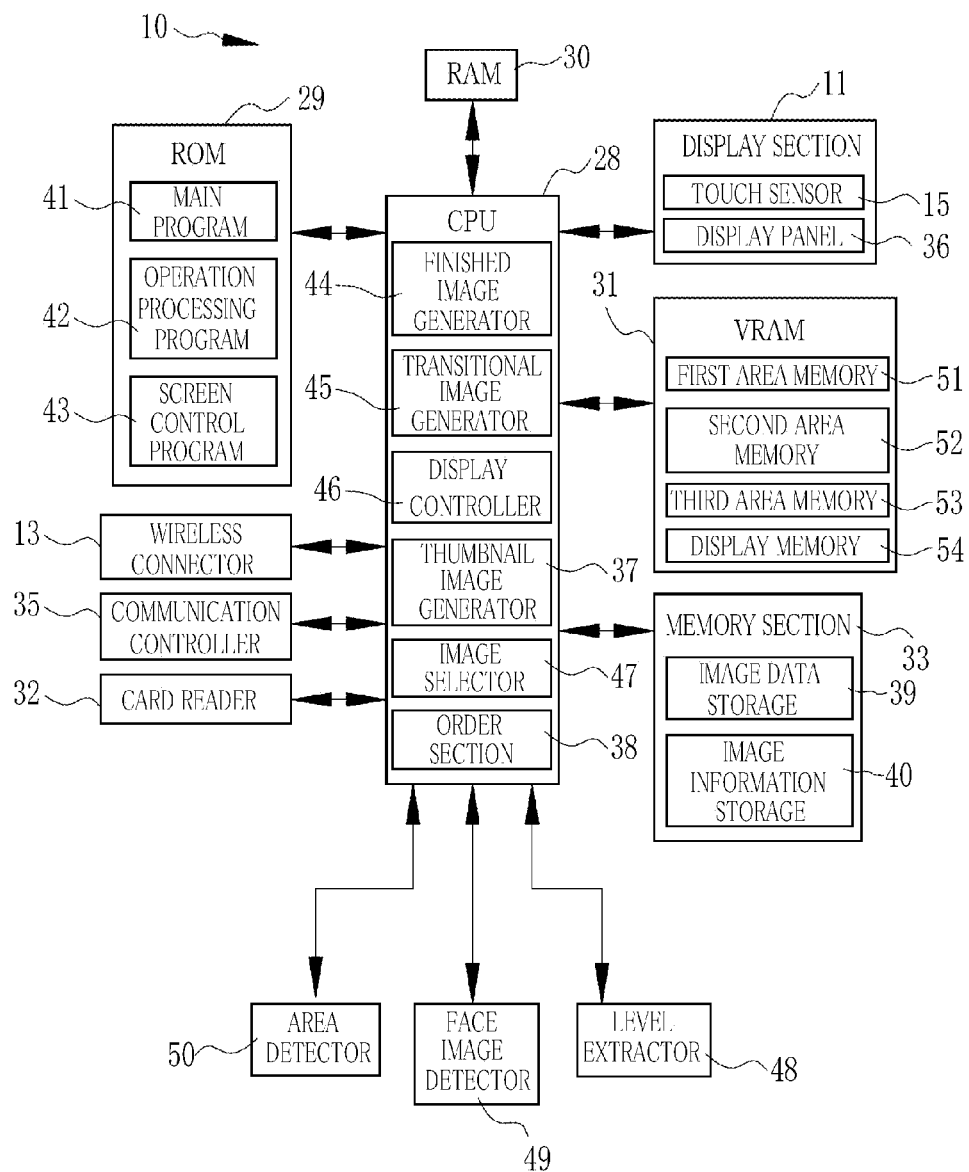
FIG. 3 is a block diagram illustrating an electrical configuration of the print order reception apparatus.

FIG. 3 shows an electrical configuration of the print order reception apparatus 10. As shown in FIG. 3, the print order reception apparatus 10 includes a CPU (Central Processing Unit) 28, the display section 11, a ROM (read only memory) 29, a RAM (Random Access Memory) 30, a VRAM (Video RAM) 31, a card reader 32, a memory section 33, a wireless connector 13, and a communication controller 35. The CPU 28, the ROM 29, and the RAM 30 function as an image processing device.

The display section 11 includes a touch sensor 15 and a display panel 36. The order screen for creating the order information is displayed on the display panel 36. A customer creates order information by performing an input operation in accordance with a procedure shown on the order screen. The card reader 32 is provided in the slot 12 so as to load the image data stored in the memory card, for example.

The CPU 28 includes a thumbnail image generator 37 and an order section 38. The thumbnail image generator 37 generates the list images 20 based on the loaded image data.

The memory section 33 includes an image data storage 39 for storing the loaded image data. The image data storage 39 stores the list images 20 in association with the loaded image data. Additionally, the memory section 33 includes an image information storage 40 for storing image information containing data of component images to be used for generating the order screen, and the like. Further, the memory section 33 stores information such as data of templates necessary for creating the order information, and a program and data necessary for editing processing.

The communication controller 35 is used to send/receive the data to/from the printer 14. The communication controller 35 is a LAN card or the like, for example. The communication controller 35 is connected to the printer 14 corresponding to printer identification information set preliminarily, and transmits the order information and the image data to the printer 14 connected to the communication controller 35. Incidentally, the printer identification information is stored in the memory section 33.

A main program 41, an operation processing program 42, a screen control program 43, and the like are written in the ROM 29. At first, the main program 41 is executed by the CPU 28 so as to create the order information. The operation processing program 42 is used such that a touch position inputted from the touch sensor 15 and input information corresponding to a type of the touch operation match the information to be processed by the CPU 28. The screen control program 43 is used to control a screen to be shifted based on the input information. The RAM 30 is a working memory for the CPU 28 or the like to execute various kinds of programs.

The CPU 28 executes the main program 41 so as to generate the order screen and create the order information based on the input information. The order section 38 creates the order information based on the input information.

The CPU 28 includes a finished image generator 44, a transitional image generator 45, and a display controller 46. The finished image generator 44 generates the finished image 22 to be displayed in the finished-state display area 19. The finished image 22 is obtained by arranging the target images 21 selected based on a certain pattern in the template 17 such that the target images 21 are displayed in a finished state. There are at least three patterns for selecting the target images 21, i.e., a first pattern, a second pattern, and a third pattern. The target images 21 in a finished state correspond to an image obtained by printing the target images 21 by the printer 14. Specifically, in addition to the appearance of each of the target images 21, the position, the size, the range, and the like of each of the target images 21 relative to the whole print (i.e., sheet) are the same as those in the finished image 22.

The finished image generator 44 generates a first finished image in which the target images 21 selected based on the first pattern are displayed, a second finished image in which the target images 21 selected based on the second pattern are displayed, and a third finished image in which the target images 21 selected based on the third pattern are displayed.

The transitional image generator 45 generates a transitional image in which at least the first finished image, the second finished image, and the third finished image are displayed in a scrollable manner in the finished-state display area 19, in the case where the first pattern currently selected is switched to the second pattern different from the first pattern upon manipulation of the first to fourth switching buttons 24 to 27.

In the case where the currently-selected pattern is switched to another pattern upon manipulation of the first to fourth switching buttons 24 to 27, the display controller 46 displays the transitional image, and then displays the finished image 22 to be switched in the finished-state display area 19. The finished image included in the transitional image is displayed in a reduced-size state relative to the finished image 22 to be switched.

The CPU 28 includes an image selector 47 for selecting the target images 21 based on a plurality of predetermined conditions. The patterns for selecting the target images 21 by the image selector 47 include a pattern for selecting the target images 21 based on a plurality of conditions in relation to information contained in the inputted images. In this embodiment, as the pattern, there are first to fourth patterns. Based on the first pattern, for example, an image evaluated as having a high image quality is selected. Based on the second pattern, for example, an image containing a main person is selected. Based on the third pattern, for example, an image containing scenery is selected. As described above, based on each of the first to third patterns, an image is selected based on a plurality of conditions in relation to the information contained in the inputted images. Further, based on the fourth pattern, for example, a plurality of inputted images are selected in a random manner. Based on the random selection, for example, it is preferable that the list images are divided into plural groups and images are selected from each of the groups, since it is possible to uniformly select images while preventing concentration on particular images. Each of the patterns for selecting the target images 21 described above is one example of the image selection pattern.

The first switching button 24 is used to select the first pattern so as to display the first finished image. The second switching button 25 is used to select the second pattern so as to display the second finished image. The third switching button 26 is used to select the third pattern so as to display the third finished image. The fourth switching button 27 is used to select the fourth pattern so as to display the fourth finished image.

Specifically, based on the first pattern, information of a brightness level is extracted from the loaded images, and based on the extracted information of the brightness level, images are selected in decreasing order of the evaluated image quality. A level extractor 48 for extracting the brightness level from the images is connected to the CPU 28. The CPU 28 retrieves the loaded images from the memory section 33 and transmits the loaded images to the level extractor 48. The level extractor 48 makes an evaluation of the image quality of each of the images. The image selector 47 selects images in decreasing order of the image quality evaluated by the level extractor 48. Incidentally, instead of selecting images in decreasing order of the image quality, images at the middle level in the evaluation of the image quality may be selected while excluding images at the high level in the evaluation of the image quality.

Based on the second pattern, a face image having a high appearance frequency in the loaded images is recognized as a main person, images containing the recognized main person are extracted, and the target images 21 are selected from the group containing the extracted images. A face image detector 49 for detecting a face image contained in each image is connected to the CPU 28 . The CPU 28 retrieves the loaded images from the memory section 33 and transmits the loaded images to the face image detector 49. The face image detector 49 recognizes a face image having a high appearance frequency in each of the loaded images as a main person, and extracts the images each containing the recognized main person. The image selector 47 selects target images 21 from the group of images extracted by the face image detector 49.

Based on the third pattern, images each containing a large area of background image, such as scenery images are extracted, and the target images 21 are selected from the group of extracted images. An area detector 50 for extracting an area of background image contained in each image is connected to the CPU 28. The CPU 28 retrieves the loaded images from the memory section 33 and transmits the loaded images to the area detector 50. The area detector 50 detects the area of background image from each image, and extracts the images containing the area of background image in decreasing order of the size of the area of background image. The image selector 47 selects target images 21 from the group of images extracted by the area detector 50.

Incidentally, the association between each of the finished images and each of the switching buttons 24 to 27 is not limited to the order described above. For example, the first switching button 24 may be a button for selecting the target images 21 from the images each containing the main person. The second switching button 25 may be a button for selecting the target images 21 from the images each having high image quality. The third switching button 26 may be a button for selecting the target images 21 in a random manner. The fourth switching button 27 may be a button for selecting the target images 21 from images each containing a background.

Further, the pattern for selecting the target images 21 is not limited to the above conditions. For example, a pattern, in which an image recognizer is provided to extract an image group containing images of a pet as an object and the target images 21 are selected from the extracted image group, may be adopted. Furthermore, image capturing information including image capturing date and time, an exposure amount, and the like, and attribute information may be used as the conditions for selecting the target images 21. The attribute information includes a comment and a title inputted by a user, and items regarding GPS (Global Positioning System), e.g., the latitude and longitude (positional information) and the moving speed of an image capturing device, and the image capturing direction at the time of image capturing.

In the case where the number of the target images 21 selected based on any one of patterns exceeds the predefined number of the target images 21 to be arranged in the template 17, the image selector 47 determines the target images 21 by additionally selecting the target images 21 from the selected image group based on predetermined conditions.

The VRAM 31 is a memory dedicated for displaying the print order screen 16 and the like on the display section 11. The VRAM 31 includes a first area memory 51, a second area memory 52, a third area memory 53, and a display memory 54.

The first area memory 51 is used to display the list images 20 in the list display area 18. The second area memory 52 is used to display the finished image 22 in the finished-state display area 19. The third area memory 53 is used to display the transitional image in the finished-state display area 19.

The images loaded in the first area memory 51, the second area memory 52, and the third area memory 53 are combined in the display memory 54. The images obtained by being combined in the display memory 54 are outputted as the print order screen 16 to the display panel 36.

Figure 4:
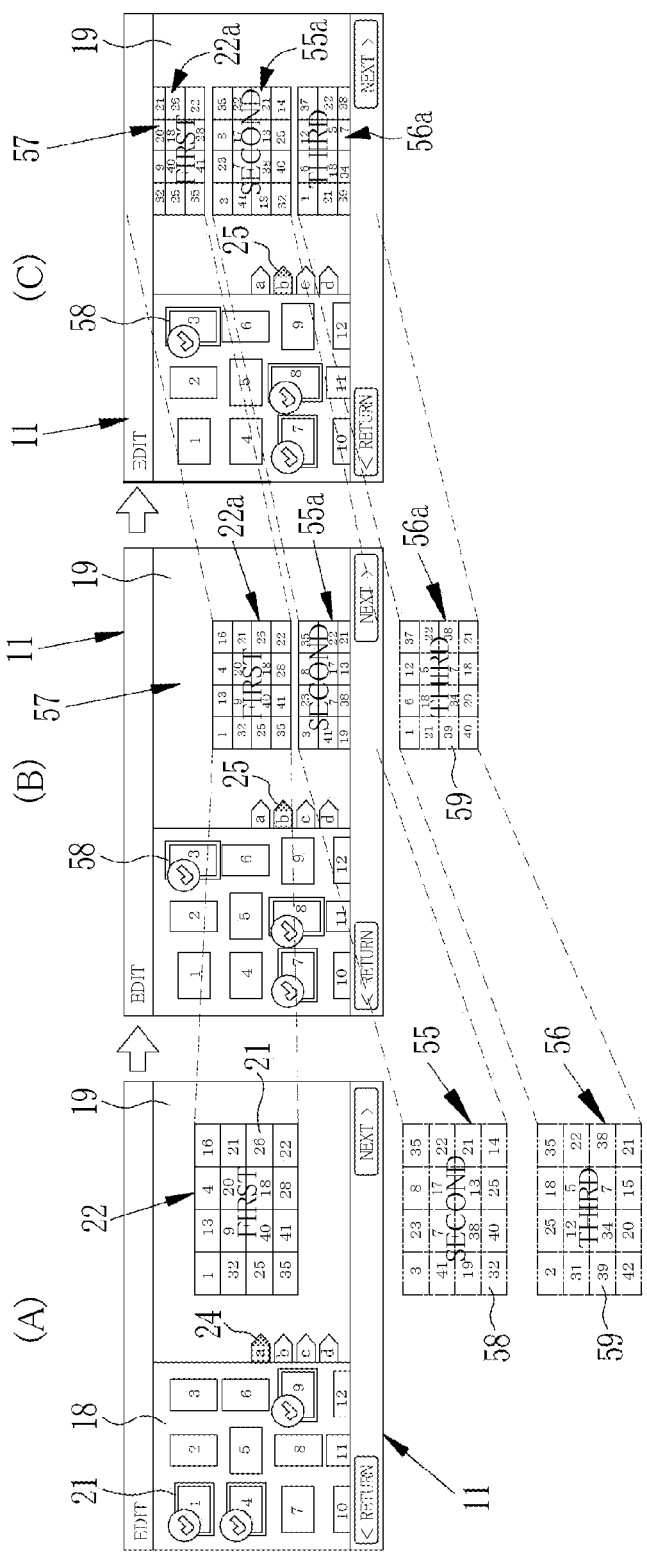
FIG. 4 is an explanatory view of a transitional image upon manipulation of a second switching button.

FIG. 4 shows a transitional image 57 in the case where the second switching button 25 is manipulated. As shown in FIG. 4(A), the first finished image 22 is displayed in the finished-state display area 19 in response to the manipulation of the first switching button 24. Upon manipulation of the second switching button 25, the transitional image generator 45 subjects the finished images 22, 55, and 56 shown in FIG. 4(A) to size reduction processing, and arranges finished images 22a, 55a, and 56a in a reduced-size state in this order from the top, for example. Thus, the transitional image 57 to be displayed in a scrollable manner in an upward direction (i.e., a short-side direction of the display section 11), for example, in the finished-state display area 19 is generated, as shown in FIG. 4(B).

A scrolling direction of each of the finished images 22a, 55a, and 56a is the same as the scrolling direction of the list display area 18. The target images 21 selected based on the first pattern are arranged in the first finished image 22. The target images 58 selected based on the second pattern are arranged in the second finished image 55. The target images 59 selected based on the third pattern are arranged in the third finished image 56.

Note that, the finished images 55, 56, and 56a shown by chain double-dashed lines outside the display section 11 in FIG. 4 are virtual images sequentially expanded in non-display areas in the VRAM 31.

The transitional image 57 is displayed as an animation image in which the first to third finished images 22a, 55a, and 56a are displayed in this order from an upstream side in the scrolling direction in the finished-state display area 19 as shown in FIG. 4(B). Thereafter, in the scrolling display, the second finished image 55a to be switched is displayed at the center of the finished-state display area 19, as shown in FIG. 4(C), and concurrently, a lower portion of the first finished image 22a, i.e., part of the first finished image 22a is displayed above the second finished image 55a, and an upper portion of the third finished image 56a, i.e., part of the third finished image 56a is displayed below the second finished image 55a. Therefore, the finished images 22a, 55a, and 56a in the transitional image 57 are generated so as to be smaller than the firstly-displayed finished image 22 described in the explanation regarding FIG. 4(A).

Figure 5:
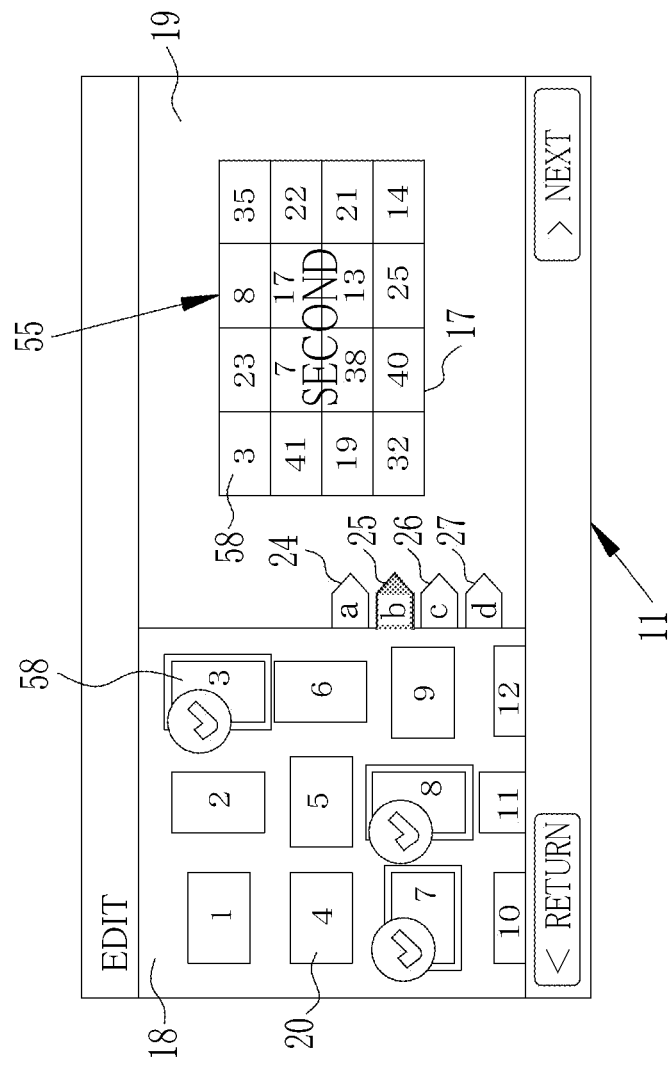
FIG. 5 is an explanatory view showing a state that a second finished image is displayed.

FIG. 5 shows the second finished image 55 displayed upon manipulation of the second switching button 25. The display controller 46 displays the second finished image 55 to be switched in the finished-state display area 19 after displaying the transitional image 57, as shown in FIG. 5. The second finished image 55 is displayed in an enlarged manner so as to be larger than the finished image 55a in the transitional image 57.

Figure 6:
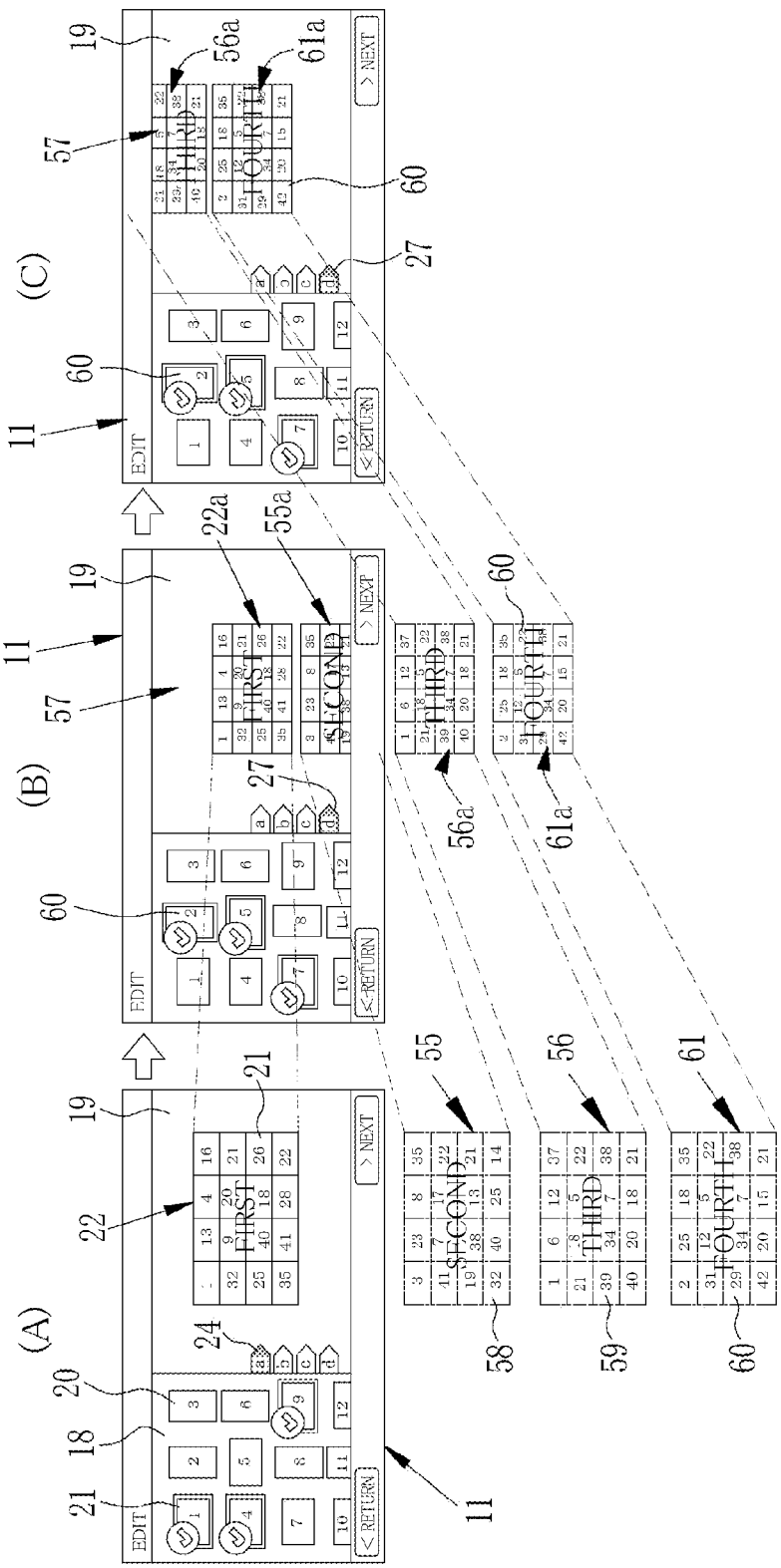
FIG. 6 is an explanatory view of a transitional image upon manipulation of a fourth switching button.

FIG. 6 shows the transitional images 57 in the case where the fourth switching button 27 is manipulated. Upon touching the fourth switching button 27, the transitional image generator 45 subjects the first to fourth finished images 22, 55, 56, and 61 shown in FIG. 6(A) to size reduction processing, and generates the transitional image 57 in which the finished images 22a, 55a, 56a, and 61a in a reduced-size state are displayed in a scrollable manner in an upward direction, for example, in the finished-state display area 19. A scrolling direction of each of the first to fourth finished images 22, 55, 56, and 61 is the same as the scrolling direction of the list display area 18. The target images 21 are disposed in the first finished image 22, the target images 58 are disposed in the second finished image 55, and the target images 59 are disposed in the third finished image 56 in the same manner as described above. Target images 60 selected based on the fourth pattern are disposed in the fourth finished image 61.

The transitional image 57 is displayed as an animation image in which the first to fourth finished images 22a, 55a, 56a, and 61a are displayed in this order from an upstream side in the scrolling direction in the finished-state display area 19 as shown in FIGS. 6(B) and 6(C). Thereafter, the fourth finished image 61a to be switched is displayed at the center of the finished-state display area 19, as shown in FIG. 6(C). Thus, the scrolling display is completed.

Also in this case, each of the finished images 22a, 55a, 56a, and 61a is displayed in a reduced-size state relative to the firstly-displayed finished image 22 described in the explanation regarding FIG. 6(A). Consequently, the first to fourth finished images 22a, 55a, 56a, and 61a are readily displayed in a scrollable manner. As a result, it is possible to surely make it recognized that there are a plurality of options for the finished images. Note that, the finished images 55, 56, 61, 56a, and 61a shown by chain double-dashed lines outside the display section 11 in FIG. 6 are virtual images sequentially expanded in non-display areas in the VRAM 31.

Figure 7:
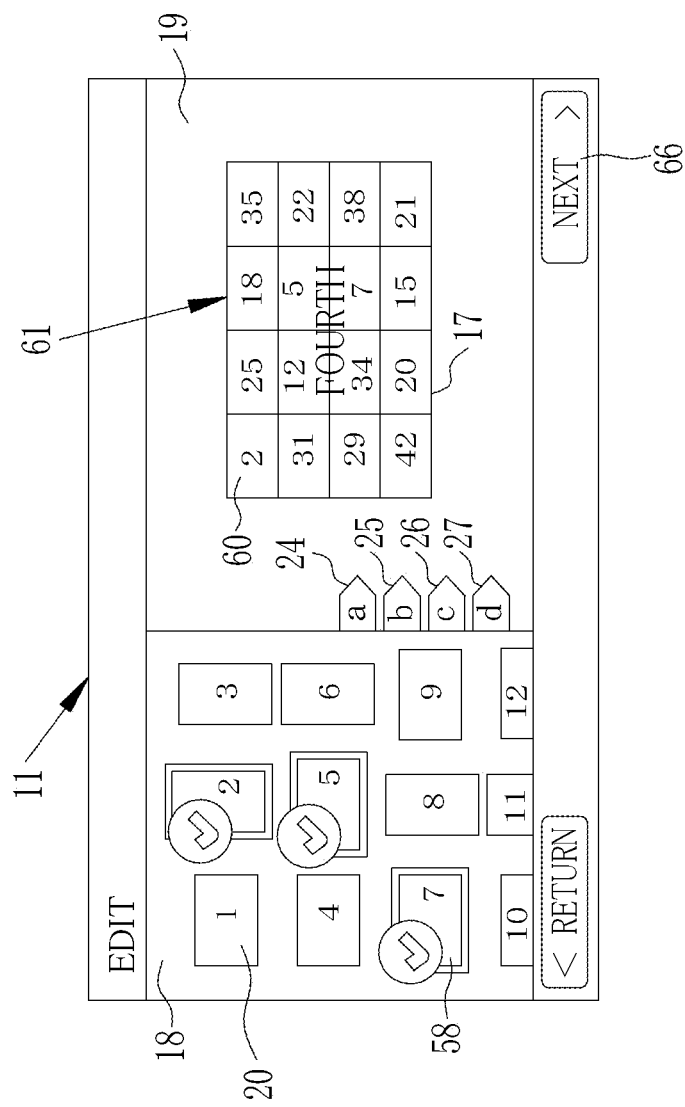
FIG. 7 is an explanatory view showing a state that a fourth finished image is displayed.

FIG. 7 shows the fourth finished image 61 displayed upon manipulation of the fourth switching button 27. After displaying the transitional image 57, the display controller 46 displays the fourth finished image 61 in an enlarged manner in the finished-state display area 19, as shown in FIG. 7.

Figure 8:
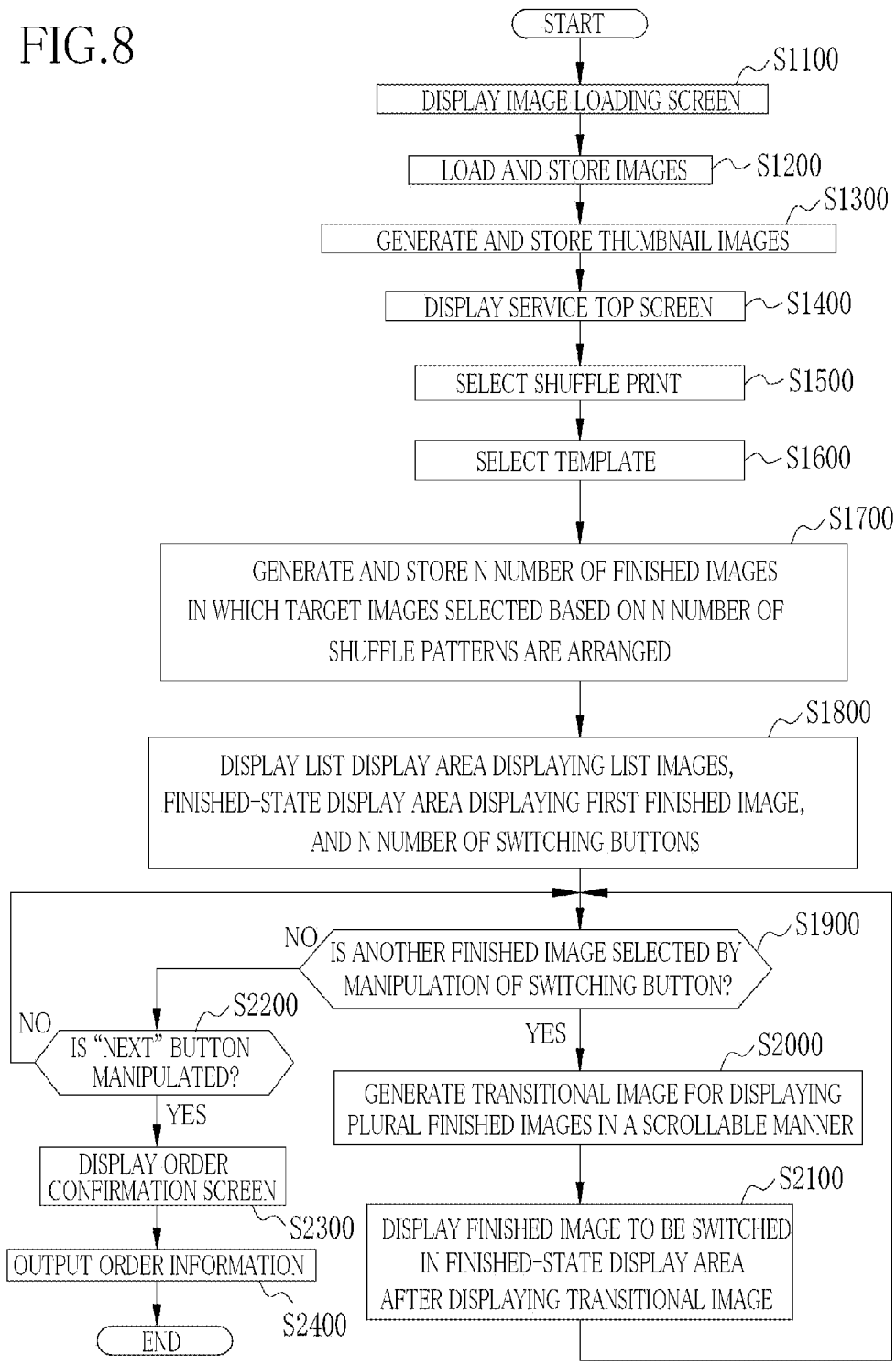
FIG. 8 is a flow chart of a procedure for making an order for printing.

FIG. 8 shows a procedure for operating the order screen. Upon activation of the print order reception apparatus 10, firstly, an image loading screen is displayed in the display section 11 (step S1100). An access point is designated on the image loading screen, and an operation for loading image data from a memory card connected thereto, for example, is performed. The loaded image data is stored in the image data storage 39 (step S1200). After the loading of the images, the thumbnail image generator 37 generates the list images 20 (i.e., thumbnail images) by subjecting each of the images to the size reduction processing. The generated list images 20 are stored in the memory section 33 (step S1300).

During or after the loading of the images, the image loading screen is shifted to a service top screen (step S1400). On the service top screen, a print type such as "one sheet print", "postcard", "photobook", and "shuffle print" is selected.

Upon selection of "shuffle print" on the service top screen (step S1500), a template selection screen is displayed. A plurality of different kinds of templates are displayed in the template selection screen. Upon selection of one of the plural templates by a touch operation (step S1600), the template selection screen is shifted to the print order screen 16 for creating the order information of the shuffle print.

In the case where the number of switching buttons is set to "N", the finished image generator 44 generates "N" number of finished images by arranging the target images 21 selected based on "N" number of patterns. The generated "N" number of finished images are respectively stored in the memory section 33 (step S1700). Specifically, the finished image generator 44 generates the first to fourth finished images 22, 55, 56, and 61 corresponding to the first to fourth switching buttons 24 to 27 after loading the images, and stores the first to fourth finished images 22, 55, 56, and 61, for the purpose of retrieving them at any time. Note that, every time the first to fourth switching buttons 24 to 27 are manipulated, the target images may be selected based on the pattern corresponding to the switching button, such that the finished images necessary for the transitional image 57 are generated.

The list display area 18, the finished-state display area 19, and the first to fourth switching buttons 24 to 27 are displayed on the print order screen 16 (step S1800). The list images 20 stored in the memory section 33 are arranged in two dimensions, for example, in the list display area 18.

The first finished image 22 is displayed at first in the finished-state display area 19 upon the manipulation of the first switching button 24. A plurality of the target images 21 selected based on the first pattern are arranged in the first finished image 22. The template consists of four rows and four columns, for example, as described in detail in the explanation regarding FIG. 2.

Upon touching the second switching button 25, for example, (i.e., YES in step S1900), the transitional image generator 45 retrieves the first to third finished images 22, 55, and 56 generated by the finished image generator 44 from the memory section 33, and subjects the first to third finished images 22, 55, and 56 retrieved from the memory section 33 to the size reduction processing, so as to generate the transitional image 57 in which the first to third finished images 22a, 55a, and 56a in a reduced-size state are displayed in a scrollable manner in an upward direction in the finished-state display area 19 (step S2000).

Upon elapse of a predetermined period of time after the second finished image 55a to be switched is displayed at the center of the finished-state display area 19 as shown in FIG. 4(C), the display controller 46 displays the second finished image 55 in an enlarged manner in the finished-state display area 19 as shown in FIG. 5 (step S2100).

Further, upon touching the fourth switching button 27, for example (i.e., YES in step S1900), the transitional image generator 45 retrieves the first to fourth finished images 22, 55, 56, and 61 from the memory section 33, and subjects the first to fourth finished images 22, 55, 56, and 61 retrieved from the memory section 33 to the size reduction processing, so as to generate the transitional image 57 in which the first to fourth finished images 22a, 55a, 56a, and 61a in a reduced-size state are displayed in a scrollable manner in an upward direction in the finished-state display area 19 (step S2000).

Upon elapse of a predetermined period of time after the fourth finished image 61a to be switched is displayed at the center of the finished-state display area 19 as shown in FIG. 6(C), the display controller 46 displays the fourth finished image 61 in an enlarged manner in the finished-state display area 19 as shown in FIG. 7 (step S2100).

The finished state of the print can be imagined by visually confirming the fourth finished image 61 displayed in the finished-state display area 19.

At the lower right portion of the print order screen 16, a button for proceeding to the next screen (hereinafter referred to as "NEXT" button) 66 is displayed as shown in FIG. 7. Upon touching the "NEXT" button 66 (i.e., YES in step S2200), the print order screen 16 is switched to an order confirmation screen (step S2300). The order information for the finished image 61 displayed in the finished-state display area 19 is created on the order confirmation screen. Upon touching an order button after setting the desired number of the prints on the order confirmation screen, the order information is created, and the order information and the image data linked to the order information are outputted to the printer 14 (step S2400).

Not only the finished image 61 to be printed which is displayed in the finished-state display area 19, but also the other finished images 22, 55, and 56 may be selected to make an order for printing them on the order confirmation screen.

Hereinafter, the relation between the selection operation of the first to fourth switching buttons 24 to 27 and the transitional image 57 generated in response to the selection operation are explained in detail. Upon the operation for switching to the Nth ("N" being the number of the switching buttons) switching button (i.e., the last switching button in the displaying order) in a state that the switching button other than the Nth switching button is selected, the transitional image generator 45 generates the transitional image 57 in which "N" number of finished images generated in accordance with the number of the switching buttons are displayed in a scrollable manner. Namely, upon operation for switching to the last switching button, all the finished images are sequentially scrolled and displayed. Incidentally, in the case where "N" is equal to or more than 3 (i.e., 3), as long as at least three finished images containing the finished image to be switched are included, instead of all the finished images, any finished image may be included in the transitional image 57.

Further, upon the operation for switching to the first switching button 24 in a state that the Nth switching button is selected, the transitional image generator 45 generates the transitional image 57, in which a plurality of the finished images showing the target images selected based on plural patterns containing the pattern corresponding to the first switching button 24, e.g., three finished images in response to the selection of the first, second, and third switching buttons are displayed in a scrollable manner. Incidentally, a transitional image, in which at least four finished images including the finished image corresponding to the first switching button 24 are displayed in a scrollable manner, maybe generated. Furthermore, in the case where a plurality of finished images are generated, the finished image corresponding to the switching button to be switched and the finished images corresponding to the previous and next switching buttons of the switching button to be switched, e.g., the finished images corresponding to the Nth, first, second, and third switching buttons may be generated.

Furthermore, in the case where "N" is equal to or more than 3 (i.e., 3), upon the operation for switching to an intermediate switching button in the displaying order, i.e., a switching button other than the first and Nth switching buttons, the transitional image generator 45 generates the transitional image 57 in which at least three finished images including the finished image corresponding to the switching button currently selected, the finished image corresponding to the switching button to be switched, and the finished image corresponding to the switching button between the switching button currently selected and the switching button to be switched are displayed in a scrollable manner. Specifically, in the case where the switching button currently selected is the second switching button and the fifth button is selected as the switching button to be switched, for example, the transitional image generator 45 generates the transitional images 57 in which four finished images corresponding to the second, third, fourth, and fifth switching buttons are displayed in a scrollable manner.

As described above, upon the operation for switching to any one of a plurality of the switching buttons, the transitional image generator 45 generates the transitional image 57 in which a plurality of the finished images showing the target images based on the plural patterns containing the pattern corresponding to the switching button to be switched are displayed in a scrollable manner.

In the animation image, the dynamic change in which plural images are scrolled from bottom to top, for example, can be visually confirmed. Thereby, it becomes possible to make it recognized that there are the options for the finished images in an intuitive manner.

Note that, the following configuration may be adopted.

Upon touching any one of the finished images while the transitional image 57 is displayed, the touched finished image is selected as the finished image to be printed, and the scrolling display is stopped at the point of time when the finished image to be printed is selected, and thereafter the selected finished image is displayed in an enlarged manner in the finish-state display area 19. In this configuration, it is preferable that all the plural finished images generated based on the plural patterns are displayed in a scrollable manner in the print order screen 16 from the beginning.

Although the scrolling direction of the transitional image 57 is from bottom to top in the display section 11 in the above embodiments, the scrolling direction of the transitional image 57 may be from top to bottom, from left to right, or from right to left. In the case where the third finished image is displayed in the finished-state display area 19, for example, it is preferable that the third finished image, the second finished image, and the first finished image are sequentially scrolled in this order from top to bottom and displayed in the finished-state display area 19, upon the manipulation of the first switching button 24.

Although the patterns for selecting the target images 21 are explained in the above embodiments, a pattern for showing a template for arrangement of the target images 21 may be used. In this case, upon the switching operation by the switching buttons, the kind of the template 17 is changed without changing the target images 21 so as to generate plural finished images. There are plural patterns for the template 17 different from one another in one of items including the background image, the position, the size, and the direction for arranging each of the target images, and the number of the target images to be arranged, or different from one another in the combination of the above items. As the background image, the color of a photo-mount varies. As the color of a photo-mount, for example, there are black, white, pink, and a stripe pattern and a check pattern with use of combination of plural colors. Each of the different kinds of templates is associated with one of the plural switching buttons. Upon selection of one of the plural switching buttons, there is generated a transitional image, in which a plurality of the finished images including the finished image showing the target images arranged in the template corresponding to the selected switching button are displayed in a scrollable manner. In this case, it is preferable that the target images are selected manually, for example, by touching the list image in the list display area.

Figure 9:
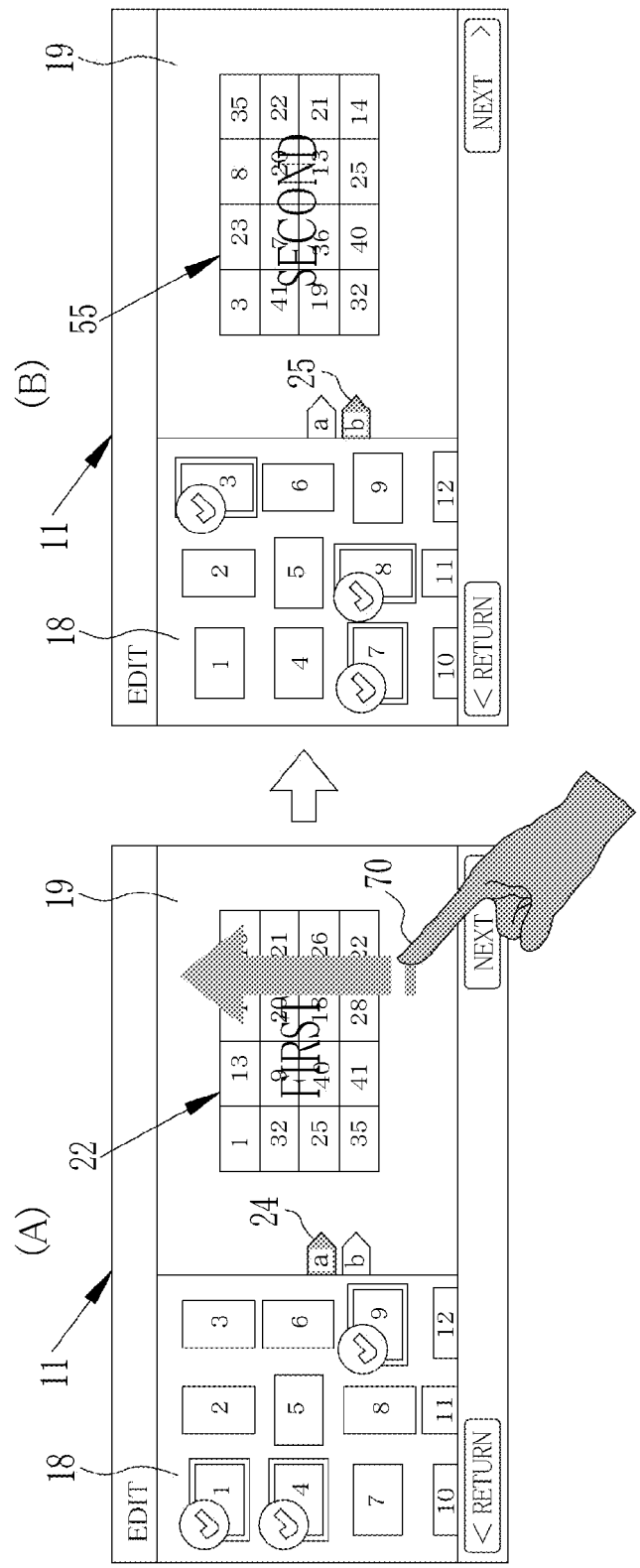
FIG. 9 is an explanatory view of an embodiment in which switching of the finished images is performed by a gesture operation.

FIG. 9 shows an embodiment in which the target images are switched by a gesture operation. In this embodiment, the switching operation between the first switching button 24 and the second switching button 25 as described in the explanation regarding FIG. 2 can be performed by a gesture operation. As shown in FIG. 9(A), in response to a swipe gesture operation for sliding a finger 70 in an upward direction (hereinafter referred to as swipe operation), for example, the transitional image generator 45 generates a transitional image in which the first finished image 22 is scrolled in accordance with the swipe operation of the finger 70 and upwardly pushed out of the display section 11, and instead, the second finished image 55 is drawn from the upstream side in the scrolling direction and displayed at the center of the finished-state display area 19 as shown in FIG. 9(B).

Note that, according to the embodiment shown in FIG. 9, a user who has used the display section 11 once preliminarily knows that the first finished image 22 and the second finished image 55 are scrolled and displayed by the swipe operation in most cases. In this case, it is unnecessary to reduce the size of each of the finished images 22 and 55 contained in the transitional image to be displayed. Incidentally, the transitional image generator 45 may reduce the size of each of the finished images 22 and 55 contained in the transitional image to be displayed. Further, all the finished images may be reduced in size and displayed in a scrollable manner such that it becomes possible to make it recognized that there are the options for the finished images only when the print order screen 16 is displayed at first.

According to the embodiment shown in FIG. 9, there is generated a transitional image in which two finished images including the target images arranged based on two patterns are displayed in a scrollable manner (i.e., N=2).

The swipe operation is detected by the operation processing program 42 described in the explanation regarding FIG. 3. The operation processing program 42 and the CPU 28 are one example of a gesture detection section.

Further, according to the embodiment shown in FIG. 9, the swipe operation is performed in a reverse direction such that the second finished image 55 is scrolled in a downward direction and displayed, and the first finished image 22 returns to a state of being displayed at the center of the finished-state display area 19 as shown in FIG. 9(A).

Upon selection of the finished image 55 by the swipe operation, the second switching button 25 corresponding to the selected finished image 55 is displayed in a highlighted state as shown in FIG. 9(B). Incidentally, the gesture operation is not limited to the swipe operation and may be a flick operation.

Figure 10:
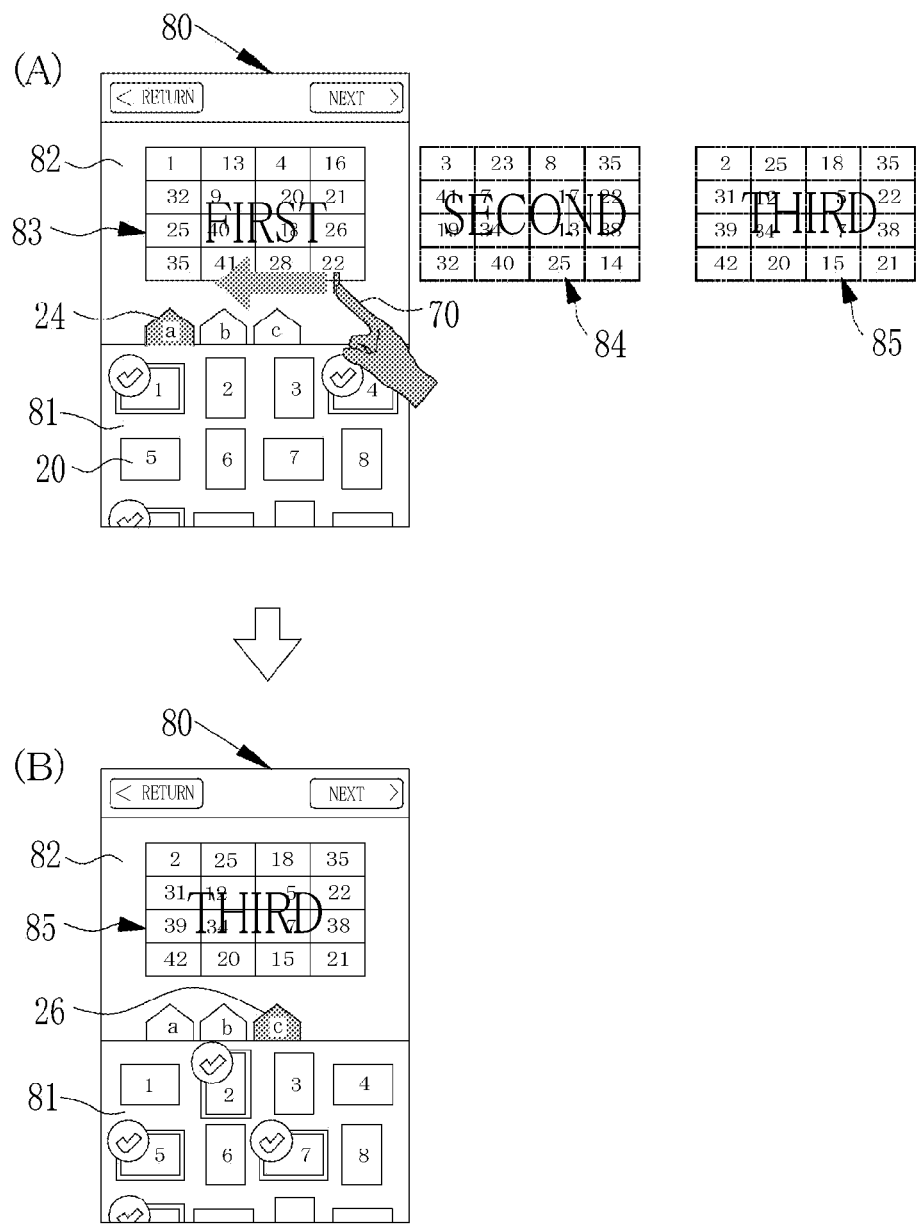
FIG. 10 is an explanatory view of an embodiment in which a vertically-long display section is provided.

FIG. 10 shows an embodiment in which a vertically long display section 80 is provided. Since the display section 80 is vertically long, a finished-state display area 82 is located adjacent to and above a list display area 81. The finished image generator 44 described in the explanation regarding FIG. 3 preliminarily generates all the kinds of finished images, i.e., a first finished image 83, a second finished image 84, and a third finished image 85 in this embodiment. Note that, the finished images 84 and 85 shown by chain double-dashed lines outside the display section 80 in FIG. 10 are virtual images sequentially expanded in non-display areas in the VRAM 31 described in the explanation regarding FIG. 3. Further, the list display area 81 is an area in which the list images 20 are scrolled in the vertical direction and displayed.

In a state that the first finished image 83 is displayed at the center of the finished-state display area 82 as shown in FIG. 10(A), the swipe operation is performed with use of the finger 70 in a direction perpendicular to a scrolling direction of the list display area 81, e.g., to the left.

Since the scrolling direction of the list display area 81 is different from that of the finished-state display area 82, even if the finger 70 used for the scrolling operation in the list display area 81 enters the finished-state display area 82, for example, the first to third finished images 83 to 85 displayed in the finished-state display area 82 are not scrolled. Consequently, it is possible to prevent an erroneous operation. Incidentally, the list display area 81 may be scrolled in a horizontal direction and displayed while the finished-state display area 82 may be scrolled in a vertical direction and displayed.

In response to the swipe operation in the finished-state display area 82, the transitional image generator 45 generates a transitional image with use of the first to third finished images 83 to 85 generated preliminarily. In the transitional image, the first finished image 83 is scrolled in accordance with the sliding of the finger 70 and pushed out of the display section 80, and instead, the second finished image 84 is drawn from the upstream side in the scrolling direction. The second finished image 84 is displayed at the center of the finished-state display area 82, such that the second finished image 84 is selected as a print target. Furthermore, as the swipe operation is continued, there is displayed a transitional image in which the third finished image 85 is drawn from the right side of the display section 80, and displayed the center of the finished-state display area 82, as shown in FIG. 10(B).

Note that, in the embodiment shown in FIG. 10, the third finished image 85 is the last one to be scrolled and displayed in the order of scrolling display. Therefore, even if the swipe operation to the left is further performed in the state shown in FIG. 10(B), no scrolling operation is performed any more. In contrast, when the swipe operation to the right is performed, the first to third finished images 83 to 85 are scrolled to the right and displayed, and finally, there appears the state shown in FIG. 10(A). Namely, a transitional image, in which the first finished image 83 returns to a state of being displayed at the center of the finished-state display area 82, is displayed.

The swipe operation is performed such that a desired finished image is displayed at the center of the finished-state display area 82, and thereby it is possible to select the target images to be printed. Incidentally, upon selection of the finished image 85 by the swipe operation, the third switching button 26 corresponding to the selected target image 85 is displayed in a highlighted state.

Although the finished-state display area 82 is located above the list display area 81 in the embodiment shown in FIG. 10, the finished-state display area 82 may be located below the list display area 81.

Figure 11:
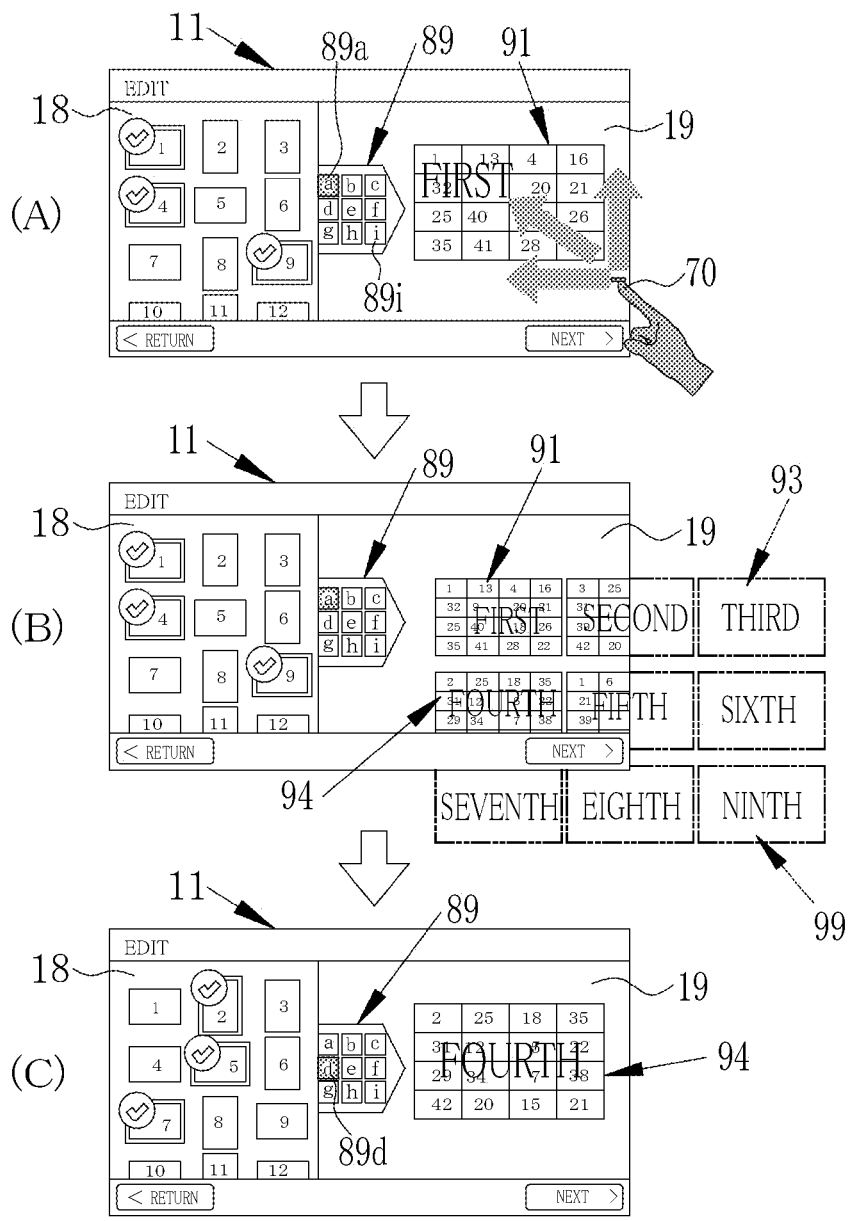
FIG. 11 is an explanatory view of an embodiment in which nine switching buttons are provided.

FIG. 11 shows an embodiment in which the print order screen is provided with a switching button group 89 having nine switching buttons. As shown in FIG. 11(A), the switching button group 89 having nine switching buttons, for example, is displayed in the finished-state display area 19. The switching button group 89 consists of switching buttons 89a to 89i, and the switching buttons 89a to 89i are two-dimensionally arranged in three rows and three columns, for example. The finished image generator 44 described in the explanation regarding FIG. 3 generates nine finished images 91 to 99 corresponding to the nine switching buttons 89a to 89i, as shown in FIG. 11(B). The nine finished images 91 to 99 are two-dimensionally arranged in three rows and three columns, for example, as with the arrangement of the switching buttons 89a to 89i.

Note that, the finished images 92 to 99 which are partially or wholly shown by chain double-dashed lines outside the display section 11 in FIG. 11 are virtual images sequentially expanded in non-display areas in the VRAM 31 described in the explanation regarding FIG. 3.

The transitional image generator 45 generates a transitional image in which the finished images 91 to 99 can be freely scrolled in a 360-degree direction including the vertical, horizontal, and diagonal directions and displayed in the finished-state display area 19 in accordance with the swipe operation performed by sliding the finger 70. In the case where there are a large number of finished images as with the finished images 91 to 99, the finished images are two-dimensionally arranged, such that all the finished images can be visually confirmed more promptly and readily in comparison with the case where the finished images are one-dimensionally arranged.

As shown in FIG. 11(C), the swipe operation is performed such that a desired finished image, for example, a fourth finished image 94 is displayed at the center of the finished-state display area 19, and thereby the finished image 94 is selected as the print target. Incidentally, upon selection of the finished image 94 by the swipe operation, a switching button 89d corresponding to the selected finished image 94 is displayed in a highlighted state.

Although the print order reception apparatus disposed at a shop is explained in each of the above embodiments, the present invention is not limited thereto. The present invention is also applicable to an image processing device and an image processing program to be used in an information terminal having a telephone function, and various devices such as PHS (Personal Handy-phone System), PDA (Personal Digital Assistance), a portable navigation device, a personal computer, and a game machine.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing device comprising:
   a display section for displaying a list display area in which a plurality of inputted images are arranged and a finished-state display area disposed next to the list display area, the finished-state display area displaying a finished image in which a plurality of target images selected from the list display area are arranged;
   a pattern selection section for selecting one of a plurality of patterns for selecting the target images or selecting one of a plurality of patterns showing templates to be used for arranging the target images;
   a finished image generator for generating the finished image in which the target images are arranged based on the pattern;
   a transitional image generator for generating a transitional image in which a plurality of the finished images are displayed in a scrollable manner in the finished-state display area, a plurality of the finished images displaying the target images based on a plurality of the patterns containing at least one of a plurality of the patterns to which pattern selection is switched by the pattern selection section; and
   a display controller for performing a control to display the transitional image and then display the finished image based on one of the patterns to which the pattern selection is switched in the finished-state display area.

2. The image processing device according to claim 1, wherein
   the transitional image generator generates a transitional image in which a first finished image, a second finished image, and a third finished image are displayed in a scrollable manner based on three patterns containing at least a second pattern, in the case where the pattern selection is switched from a first pattern to the second pattern by the pattern selection section, and
   the first finished image, the second finished image, and the third finished image are scrolled and displayed in this order from an upstream side in a scrolling direction, and then a selected one of the first to third finished images is displayed at the center of the finished-state display area in the transitional image.

3. The image processing device according to claim 1, wherein a finished image contained in the transitional image displayed by the transitional image generator is reduced in size so as to have a size smaller than that of the finished image generated by the finished image generator.

4. The image processing device according to claim 1, wherein the scrolling direction is along a short side of the display section.

5. The image processing device according to claim 1, wherein the finished image includes a plurality of the target images two-dimensionally arranged in a plurality of rows and a plurality of columns.

6. The image processing device according to claim 1, further comprising an image selector for generating a plurality of image selection patterns based on a plurality of predetermined conditions in the case where the pattern corresponds to the image selection pattern for selecting the target images.

7. The image processing device according to claim 6, wherein the image selection pattern includes a pattern for selecting the target images based on conditions relating to information contained in the inputted images.

8. The image processing device according to claim 6, wherein the image selection pattern includes a pattern for selecting a plurality of the inputted images in a random manner.

9. The image processing device according to claim 1, wherein
the display section includes a touch sensor, and
the pattern selection section is equivalent to switching buttons each of which is displayed in the finished-state display area and used for a touch operation.

10. The image processing device according to claim 1, wherein
the display section includes a touch sensor, and
the pattern selection section includes a gesture detection section for detecting a gesture operation.

11. The image processing device according to claim 1, further comprising an order section for making an order for printing the finished image displayed in the finished-state display area.

12. An image processing method comprising the steps of:
a display step for displaying a list display area in which a plurality of inputted images are arranged and a finished-state display area disposed next to the list display area, the finished-state display area displaying a finished image in which a plurality of target images selected from the list display area are arranged;
a pattern selection step for selecting one of a plurality of patterns for selecting the target images or selecting one of a plurality of patterns showing templates to be used for arranging the target images;
a finished image generating step for generating the finished image in which the target images are arranged based on the pattern;
a transitional image generating step for generating a transitional image in which a plurality of the finished images are displayed in a scrollable manner in the finished-state display area, a plurality of the finished images displaying the target images based on a plurality of the patterns containing at least one of a plurality of the patterns to which pattern selection is switched; and
a display controlling step for performing a control to display the transitional image and then display the finished image based on one of the patterns to which the pattern selection is switched in the finished-state display area.

13. A storage medium storing an image processing program for making a computer execute the following steps in a computer-readable manner:
a display step for displaying a list display area in which a plurality of inputted images are arranged and a finished-state display area disposed next to the list display area, the finished-state display area displaying a finished image in which a plurality of target images selected from the list display area are arranged;
a pattern selection step for selecting one of a plurality of patterns for selecting the target images or selecting one of a plurality of patterns showing templates to be used for arranging the target images;
a finished image generating step for generating the finished image in which the target images are arranged based on the pattern;
a transitional image generating step for generating a transitional image in which a plurality of the finished images are displayed in a scrollable manner in the finished-state display area, a plurality of the finished images displaying the target images based on a plurality of the patterns containing at least one of a plurality of the patterns to which pattern selection is switched; and
a display controlling step for performing a control to display the transitional image and then display the finished image based on one of the patterns to which the pattern selection is switched in the finished-state display area.

* * * * *